United States Patent
Clark et al.

(10) Patent No.: US 10,013,450 B2
(45) Date of Patent: Jul. 3, 2018

(54) USING KNOWLEDGE GRAPHS TO IDENTIFY POTENTIAL INCONSISTENCIES IN WORKS OF AUTHORSHIP

(71) Applicant: International Business Machines Corporation, Armonk, NY (US)

(72) Inventors: Adam T. Clark, Mantorville, MN (US); Anthony W. Eichenlaub, Rochester, MN (US); John E. Petri, St. Charles, MN (US)

(73) Assignee: International Business Machines Corporation, Armonk, NY (US)

( * ) Notice: Subject to any disclaimer, the term of this patent is extended or adjusted under 35 U.S.C. 154(b) by 211 days.

(21) Appl. No.: 14/957,646

(22) Filed: Dec. 3, 2015

(65) Prior Publication Data
US 2017/0161311 A1  Jun. 8, 2017

(51) Int. Cl.
*G06F 17/00* (2006.01)
*G06F 17/30* (2006.01)

(52) U.S. Cl.
CPC .. *G06F 17/30371* (2013.01); *G06F 17/30542* (2013.01); *G06F 17/30958* (2013.01)

(58) Field of Classification Search
CPC .......... G06F 17/30867; G06F 17/2775; G06F 17/30864; G06F 17/2705; G06F 17/30684
See application file for complete search history.

(56) References Cited

U.S. PATENT DOCUMENTS

| | | | |
|---|---|---|---|
| 5,721,939 A | 2/1998 | Kaplan | |
| 6,289,304 B1 | 9/2001 | Grefenstette | |
| 7,092,871 B2 | 8/2006 | Pentheroudakis et al. | |
| 7,117,206 B1 | 10/2006 | Bharat et al. | |
| 7,587,309 B1 | 9/2009 | Rohrs et al. | |
| 7,752,204 B2 | 7/2010 | Kao et al. | |
| 8,145,677 B2 | 3/2012 | Al-Shameri | |
| 8,380,492 B2 | 2/2013 | Xu et al. | |
| 8,407,253 B2 | 3/2013 | Ryu et al. | |
| 8,990,234 B1 | 3/2015 | Myslinski | |
| 9,015,037 B2 | 4/2015 | Myslinski | |
| 9,679,558 B2 | 6/2017 | Akbacak et al. | |
| 2006/0106847 A1 | 5/2006 | Eckardt, III et al. | |
| 2007/0130257 A1 | 6/2007 | Bedi et al. | |
| 2009/0012842 A1 | 1/2009 | Srinivasan et al. | |
| 2009/0094231 A1 | 4/2009 | Marvit et al. | |
| 2010/0262576 A1 | 10/2010 | Stockwell et al. | |

(Continued)

OTHER PUBLICATIONS

Ciampaglia et al., "Computational fact checking from knowledge networks," arXiv:1501.03471v1, Jan. 14, 2015, 20 pages.

(Continued)

*Primary Examiner* — Truong Vo
(74) *Attorney, Agent, or Firm* — Nicholas D. Bowman

(57) ABSTRACT

A processor obtains a target knowledge graph that includes target nodes that represent concepts used within a target work and target edges between target nodes that represent links used within the target work to associate the concepts used therein with each other. The processor also obtains a background knowledge graph that includes background nodes that represent concepts used within a background work and background edges between background nodes that represent links used within the background work to associate the concepts used therein with each other. The processor compares a portion of the target knowledge graph to a portion of the background knowledge graph. Based on the comparison, the processor identifies a potential inconsistency between the background work and the target work.

20 Claims, 11 Drawing Sheets

(56) References Cited

U.S. PATENT DOCUMENTS

| | | |
|---|---|---|
| 2011/0137919 A1 | 6/2011 | Ryu et al. |
| 2011/0302168 A1 | 12/2011 | Aggarwal |
| 2012/0056901 A1 | 3/2012 | Sankarasubramaniam et al. |
| 2012/0102405 A1 | 4/2012 | Zuckerman et al. |
| 2014/0169767 A1 | 6/2014 | Goldberg |
| 2014/0172427 A1 | 6/2014 | Liu et al. |
| 2014/0195897 A1 | 7/2014 | Balinsky et al. |
| 2014/0280614 A1 | 9/2014 | Alakuijala et al. |
| 2014/0282586 A1 | 9/2014 | Shear et al. |
| 2016/0292248 A1 | 10/2016 | Garcia |
| 2017/0213130 A1 | 7/2017 | Khatri et al. |

OTHER PUBLICATIONS

Anyanwu et al., "SPARQ2L: Towards Support for Subgraph Extraction Queries in RDF Databases," Proceedings of the 16th International Conference on World Wide Web, pp. 797-806, May 8-12, 2007, Banff, Alberta, Canada ACM 978-1-59593-654-07/07/0005.

Cedeno et al., "R2DF Framework for Ranked Path Queries over Weighted RDF Graphs," Proceedings of the International Conference on Web Intelligence, Mining and Semantics, Article No. 40, 12 pages, May 25-27, 2011, Sogndal, Norway, Copyright 2011 ACM DOI: 10.1145/1988688.1988736.

Kasneci et al., "NAGA: Searching and Ranking Knowledge," IEEE 24th International Conference on Data Engineering, Apr. 7-12, 2008, pp. 953-962, Cancun, © 2008 IEEE DOI: 10.1109/ICDE.2008.4497504.

Seijo, G., "Rhizomes for the Understanding of the Production of Social Sciences," Organization Management Journal, 17 pages.

Clark et al., "Targeted Story Summarization Using Natural Language Processing," U.S. Appl. No. 14/957,655, filed Dec. 3, 2015.

Clark et al., "Structuring Narrative Blocks in a Logical Sequence," U.S. Appl. No. 14/957,647, filed Dec. 3, 2015.

List of IBM Patents or Patent Applications Treated as Related, Dec. 1, 2015, 2 pages.

US 10,013,450 B2

USING KNOWLEDGE GRAPHS TO IDENTIFY POTENTIAL INCONSISTENCIES IN WORKS OF AUTHORSHIP

BACKGROUND

The present disclosure relates generally to the field of natural language processing (NLP), and, more particularly, to using knowledge graphs generated based on NLP to identify potential inconsistencies in works of authorship.

It is common in literature to have a narrative universe of characters and events, factual and/or fictitious, that appear in a book or movie, or across several different books or movies. When writing a new work of authorship in the narrative universe, a writer could inadvertently include an inconsistency in the new work. Such an inconsistency could include, for example, a factual inaccuracy or some other misstatement that is inconsistent with that which was previously published about the narrative universe.

SUMMARY

Embodiments of the present disclosure include a method, as well as a computer program product and a system for implementing the method. As part of the method, a processor obtains a target knowledge graph generated based on content of a target work. The target knowledge graph includes target nodes that represent concepts used within the target work and target edges between target nodes that represent links used within the target work to associate the concepts used within the target work to each other. As further part of the method, the processor obtains a background knowledge graph generated based on content of at least one background work associated with the content of the target work. The background knowledge graph includes background nodes that represent concepts used within the at least one background work and background edges between background nodes that represent links used within the at least one background work to associate the concepts used within the at least one background work to each other. As further part of the method, the processor compares at least a portion of the target knowledge graph to at least a portion of the background knowledge graph. As further part of the method, the processor identifies, based on the comparison, a potential inconsistency between the at least one background work and the target work.

The above summary is not intended to describe each illustrated embodiment or every implementation of the present disclosure.

BRIEF DESCRIPTION OF THE DRAWINGS

The drawings included in the present disclosure are incorporated into, and form part of, the specification. They illustrate embodiments of the present disclosure and, along with the description, serve to explain the principles of the disclosure. The drawings are only illustrative of typical embodiments and do not limit the disclosure.

Figure 1:
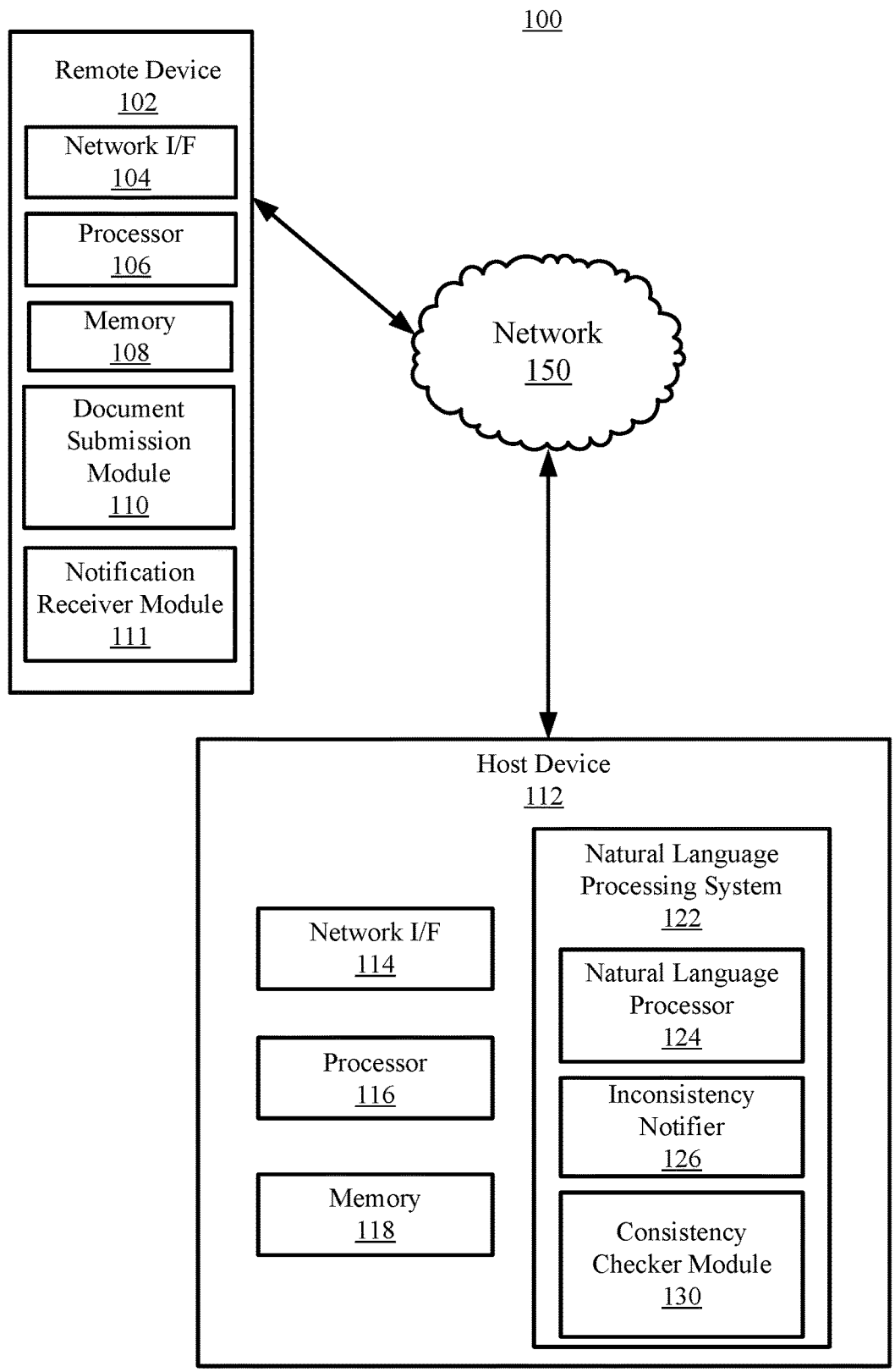
FIG. 1 illustrates a block diagram of an example computing environment in which illustrative embodiments of the present disclosure may be implemented.

While the embodiments described herein are amenable to various modifications and alternative forms, specifics thereof have been shown by way of example in the drawings and will be described in detail. It should be understood, however, that the particular embodiments described are not to be taken in a limiting sense. On the contrary, the intention is to cover all modifications, equivalents, and alternatives falling within the spirit and scope of the invention.

DETAILED DESCRIPTION

Aspects of the present disclosure relate generally to the field of natural language processing (NLP), and in particular to using knowledge graphs generated based on NLP to identify potential inconsistencies in work of authorships. While the present disclosure is not necessarily limited to such applications, various aspects of the disclosure may be appreciated through a discussion of various examples using this context.

As used herein, a work of authorship (also referred to as a "work") includes products of creative or factual expression, such as books, songs, and/or videos. When an author creates a new work, mistakes may be introduced. These mistakes may be internal errors such as grammatical errors, spelling errors, or conflicts between one section of the work and another section of the same work. These mistakes may also be inconsistencies between the new work and prior, previously published works. Unlike errors of grammar or spelling, these inconsistencies may be difficult to detect because they may, in some instances, require one to reference a large amount of source material in order to identify and correct the inconsistencies. This difficulty may be compounded when considering a fictional narrative universe because in a fictional setting a statement that is inconsistent with statements made in prior works may not necessarily be factually inaccurate.

In some embodiments of the present disclosure, methods of identifying potential inconsistencies between a target work (the work of interest to the user) and a set of one or more background works (works that are associated with the target work based on content) may be utilized.

More specifically, in some embodiments, a computer system may obtain a target knowledge graph (based on target work content) and a background knowledge graph (based on background work content). The computer system may compare the knowledge graphs to each other. Based on these comparisons, potential inconsistencies between the target work and the set of background works may be identified. As described herein, various techniques or methods may be used, as part of or in addition to these comparisons, for the purpose of inconsistency identification.

In some embodiments, the computer system may obtain one or both of the knowledge graphs of interest by ingesting relevant works, using natural language processing modules contained within the computer system, and then by using additional modules of the computer system to generate the knowledge graphs based on the ingested content.

In some embodiments, the computer system may notify the user of the potential inconsistencies. This user, such as author of the target work, may then rewrite portions of the target work in order to avoid the discovered inconsistencies.

In some embodiments, a target knowledge graph may include a plurality of nodes (target nodes) and edges (target edges). The target nodes may represent (or otherwise relate to) concepts used within in the target work, such as actors, characters, themes, and/or actions. The target nodes may be linked together with target edges to represent links (e.g., connections) used within the target work to associate the concepts used within the target work (the target nodes) to each other. For example, two concepts with each concept representing a person may be linked together with an edge that represents that the persons are married. In some embodiments, actions may also be represented by edges (e.g., an edge between two concepts may indicate that a first character ran after a second character).

In some embodiments, a background knowledge graph may also include a plurality of nodes (background nodes) and edges (background edges). The background nodes may represent (or otherwise relate to) concepts used within the set of background works, such as actors, characters, themes, and/or actions. The background nodes may be linked together with background edges to represent links (e.g., connections) used within (or among) the background works to associate the concepts used within (or among) the background works to each other.

As discussed above, aspects of the disclosure may relate to natural language processing. Accordingly, an understanding of the embodiments of the present disclosure may be aided by describing embodiments of natural language processing systems and the environments in which these systems may operate. Turning now to the figures, FIG. 1 illustrates a block diagram of an example computing environment 100 in which illustrative embodiments of the present disclosure may be implemented. In some embodiments, the computing environment 100 may include a remote device 102 and a host device 112.

Consistent with various embodiments, the remote device 102 and the host device 112 may be computer systems. The remote device 102 and the host device 112 may include one or more processors 106 and 116 and one or more memories 108 and 118, respectively. The remote device 102 and the host device 112 may be configured to communicate with each other through an internal or external network interface 104 and 114. The network interfaces 104 and 114 may be, for example, modems or network interface cards. The remote device 102 and/or the host device 112 may be equipped with a display or monitor. Additionally, the remote device 102 and/or the host device 112 may include optional input devices (e.g., a keyboard, mouse, scanner, or other input device), and/or any commercially available or custom software (e.g., browser software, communications software, server software, natural language processing software, search engine and/or web crawling software, filter modules for filtering content based upon predefined parameters, etc.). The host device 112 may, in some embodiments, be connected to an output device. The output device may include a device that is useable to read, listen to, or watch a target work, background works, or marked up portions of the target work that include clear labels to aid a user in correcting potential inconsistencies in the target work. For example, the output device may be a tablet, an e-reader, or a printer. In some embodiments, the remote device 102 and/or the host device 112 may be servers, desktops, laptops, or hand-held devices.

The remote device 102 and the host device 112 may be distant from each other and communicate over a network 150. In some embodiments, the host device 112 may be a central hub from which remote device 102 can establish a communication connection, such as in a client-server networking model. Alternatively, the host device 112 and remote device 102 may be configured in any other suitable networking relationship (e.g., in a peer-to-peer configuration or using any other network topology).

In some embodiments, the network 150 can be implemented using any number of any suitable communications media. For example, the network 150 may be a wide area network (WAN), a local area network (LAN), an internet, or an intranet. In certain embodiments, the remote device 102 and the host device 112 may be local to each other and communicate via any appropriate local communication medium. For example, the remote device 102 and the host device 112 may communicate using a local area network (LAN), one or more hardwire connections, a wireless link or router, or an intranet. In some embodiments, the remote device 102 and the host device 112 may be communicatively coupled using a combination of one or more networks and/or one or more local connections. For example, the first remote device 102 may be hardwired to the host device 112 (e.g., connected with an Ethernet cable) while a second remote device (not shown) may communicate with the host device using the network 150 (e.g., over the Internet).

In some embodiments, the network 150 can be implemented within a cloud computing environment, or using one or more cloud computing services. Consistent with various embodiments, a cloud computing environment may include a network-based, distributed data processing system that provides one or more cloud computing services. Further, a cloud computing environment may include many computers (e.g., hundreds or thousands of computers or more) disposed within one or more data centers and configured to share resources over the network 150.

In some embodiments, the remote device 102 may enable users to submit (or may submit automatically with or without user input) electronic documents (e.g., works of authorship such as books) to the host devices 112 in order to create one or more knowledge graphs that may be used to identify potential inconsistencies in a target work. For example, the remote device 102 may include electronic document submission module 110 and a user interface (UI). The electronic document submission module 110 may be in the form of a web browser or any other suitable software module, and the UI may be any type of interface (e.g., command line prompts, menu screens, graphical user interfaces). The UI may allow a user to interact with the remote device 102 to submit, using the document submission module 110, one or more books or other works of authorship to the host device 112. In some embodiments, the remote device 102 may further include a notification receiver module 111. This module may be configured to receive notifications, from the host device 112, of potential inconsistencies in a previously submitted target work.

In some embodiments, a user may scan physical documents into the remote device (or the host device). The remote device (or host device) may then perform optical character recognition on the scanned documents to convert the document to machine-encoded text. The machine-encoded text may, if necessary, be transmitted to the host device using the document submission module 110 and the user interface.

In some embodiments, the host device 112 may include a natural language processing system 122. The natural language processing system 122 may include a natural language processor 124, an inconsistency notifier 126, and a consistency checker module 130. The natural language processor 124 may include numerous subcomponents, such as a tokenizer, a part-of-speech (POS) tagger, a semantic relationship identifier, and a syntactic relationship identifier. An example natural language processor is discussed in more detail in reference to FIG. 2.

In some embodiments, the consistency checker module 130 may be configured to compare a knowledge graph generated based on a target work (a target knowledge graph) to another knowledge graph generated based on a set of one or more background works (a background knowledge graph) in order to identify potential inconsistencies in the content of the target work as compared to the content of the set of background works. The consistency checker module 130 may include one or more submodules or units to perform its functions, as discussed in more detail in reference to FIG. 2. In addition, the inconsistency notifier 126 may be connected to the consistency checker module 130 and may serve to notify a user at the remote system 102 (e.g., via the notification receiver module 111) of potential inconsistencies that the consistency checker module 130 identifies.

In some embodiments, the natural language processing system 122 may further include a search application (not shown). The search application may be implemented using a conventional or other search engine, and may be distributed across multiple computer systems. The search application may be configured to search one or more databases or other computer systems for content of background works that are related to a target electronic document (such as a book) submitted by a remote device 102. For example, the search application may be configured to search a corpus (or universe) of books related to the submitted book (e.g., target work) to identify relationships and aid in the obtaining of relevant knowledge graphs.

While FIG. 1 illustrates a computing environment 100 with a single host device 112 and a single remote device 102, suitable computing environments for implementing embodiments of this disclosure may include any number of remote devices and host devices. The various modules, systems, and components illustrated in FIG. 1 may exist, if at all, across a plurality of host devices and remote devices. For example, some embodiments may include two host devices. The two host devices may be communicatively coupled using any suitable communications connection (e.g., using a WAN, a LAN, a wired connection, an intranet, or the Internet). The first host device may include a natural language processing system configured to generate a target knowledge graph for a submitted book, and the second host device may include a software module configured to compare the target knowledge graph to a background knowledge graph.

It is noted that FIG. 1 is intended to depict the representative major components of an exemplary computing environment 100. In some embodiments, however, individual components may have greater or lesser complexity than as represented in FIG. 1, components other than or in addition to those shown in FIG. 1 may be present, and the number, type, and configuration of such components may vary.

Figure 2:
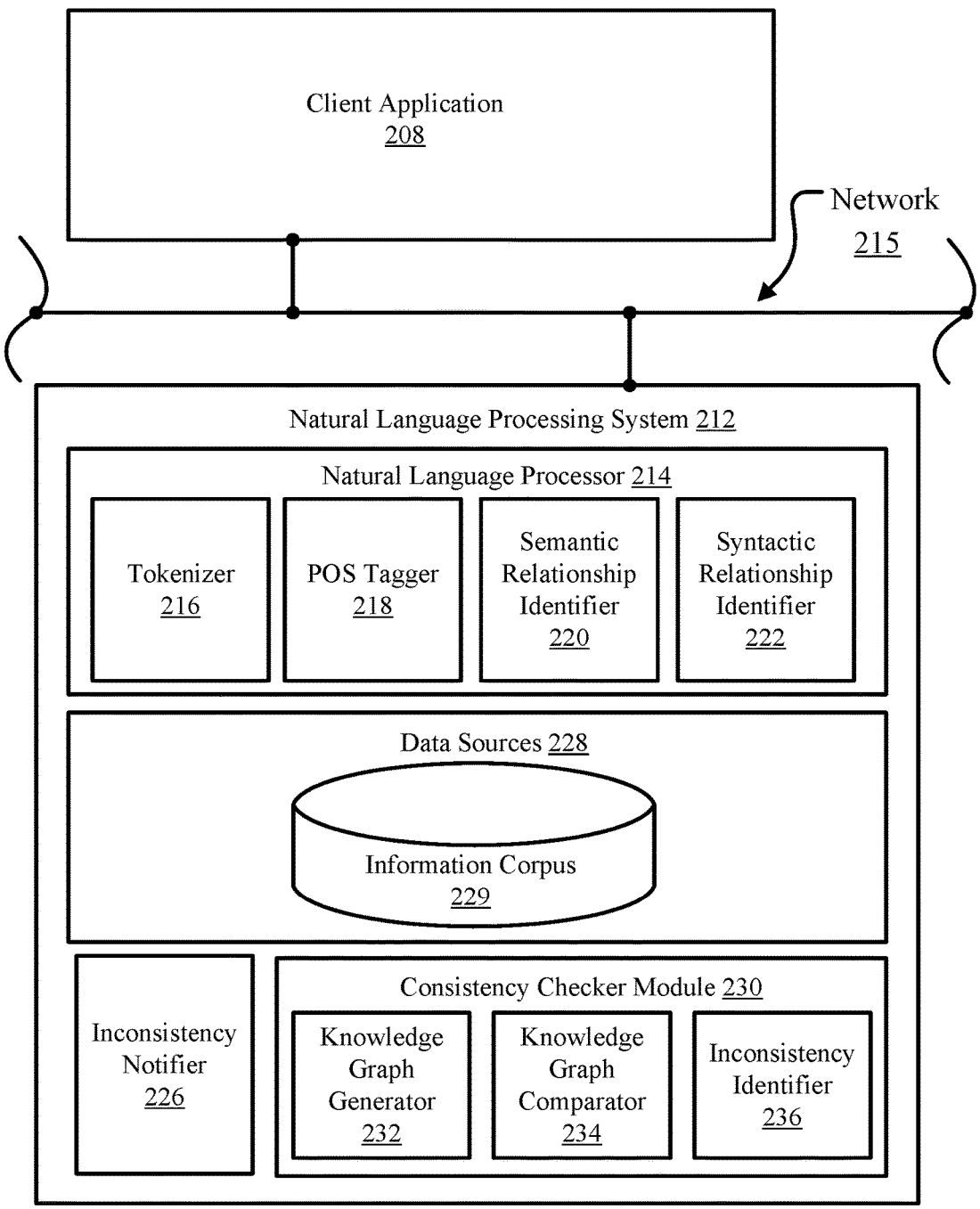
FIG. 2 illustrates a block diagram of an exemplary system architecture, including a natural language processing system, configured to use knowledge graphs to identify potential inconsistencies in a work of authorship, in accordance with embodiments of the present disclosure.

Referring now to FIG. 2, shown is a block diagram of an exemplary system architecture 200, including a natural language processing system 212, configured to use knowledge graphs to identify potential inconsistencies in a work of authorship, in accordance with embodiments of the present disclosure. In some embodiments, a remote device (such as remote device 102 of FIG. 1) may submit electronic documents (such as books) to be analyzed to the natural language processing system 212 which may be housed on a host device (such as host device 112 of FIG. 1). Such a remote device may include a client application 208, which may itself involve one or more entities operable to generate or modify information in a work that is then dispatched to a natural language processing system 212 via a network 215.

Consistent with various embodiments, the natural language processing system 212 may respond to electronic document submissions sent by the client application 208. Specifically, the natural language processing system 212 may analyze a received work to aid in the identification of potential inconsistencies in that work or another work. More specifically, the natural language processing system 212 may use the received work to generate a background knowledge graph or a target knowledge graph, depending on whether the work is a background work or a target work. In some embodiments, the natural language processing system 212 may include a natural language processor 214, data sources 228, an inconsistency notifier 226, and a consistency checker module 230.

The natural language processor 214 may be a computer module that analyzes the received works and other electronic documents. The natural language processor 214 may perform various methods and techniques for analyzing electronic documents (e.g., syntactic analysis, semantic analysis, etc.). The natural language processor 214 may be configured to recognize and analyze any number of natural languages. In some embodiments, the natural language processor 214 may parse passages of the documents. Further, the natural language processor 214 may include various modules to perform analyses of electronic documents. These modules may include, but are not limited to, a tokenizer 216, a part-of-speech (POS) tagger 218, a semantic relationship identifier 220, and a syntactic relationship identifier 222.

In some embodiments, the tokenizer 216 may be a computer module that performs lexical analysis. The tokenizer 216 may convert a sequence of characters into a sequence of tokens. A token may be a string of characters included in an electronic document and categorized as a meaningful symbol. Further, in some embodiments, the tokenizer 216 may identify word boundaries in an electronic document and break any text passages within the document into their component text elements, such as words, multiword tokens, numbers, and punctuation marks. In some embodiments, the tokenizer 216 may receive a string of characters, identify the lexemes in the string, and categorize them into tokens.

Consistent with various embodiments, the POS tagger 218 may be a computer module that marks up a word in passages to correspond to a particular part of speech. The POS tagger 218 may read a passage or other text in natural language and assign a part of speech to each word or other token. The POS tagger 218 may determine the part of speech to which a word (or other text element) corresponds based on the definition of the word and the context of the word. The context of a word may be based on its relationship with adjacent and related words in a phrase, sentence, or paragraph. In some embodiments, the context of a word may be dependent on one or more previously analyzed electronic documents (e.g., the content of one book may shed light on the meaning of text elements in another book, particularly if they are part of the same corpus or universe). Examples of parts of speech that may be assigned to words include, but are not limited to, nouns, verbs, adjectives, adverbs, and the like. Examples of other part of speech categories that POS tagger 218 may assign include, but are not limited to, comparative or superlative adverbs, wh-adverbs, conjunctions, determiners, negative particles, possessive markers, prepositions, wh-pronouns, and the like. In some embodiments, the POS tagger 218 may tag or otherwise annotate tokens of a passage with part of speech categories. In some embodiments, the POS tagger 218 may tag tokens or words of a passage to be parsed by other components of the natural language processing system 212.

In some embodiments, the semantic relationship identifier 220 may be a computer module that is configured to identify semantic relationships of recognized text elements (e.g., words, phrases) in documents. In some embodiments, the semantic relationship identifier 220 may determine functional dependencies between entities and other semantic relationships.

Consistent with various embodiments, the syntactic relationship identifier 222 may be a computer module that is configured to identify syntactic relationships in a passage composed of tokens. The syntactic relationship identifier 222 may determine the grammatical structure of sentences such as, for example, which groups of words are associated as phrases and which word is the subject or object of a verb. The syntactic relationship identifier 222 may conform to formal grammar.

In some embodiments, the natural language processor 214 may be a computer module that may parse a document and generate corresponding data structures for one or more portions of the document. For example, in response to receiving a book at the natural language processing system 212, the natural language processor 214 may output parsed text elements from the book as data structures. In some embodiments, a parsed text element may be represented in the form of a parse tree or other graph structure. To generate the parsed text element, the natural language processor 214 may trigger computer modules 216-222.

In some embodiments, the output of the natural language processor 214 may be stored as an information corpus 229 in one or more data sources 228. In some embodiments, data sources 228 may include data warehouses, information corpora, data models, and document repositories. The information corpus 229 may enable data storage and retrieval. In some embodiments, the information corpus 229 may be a storage mechanism that houses a standardized, consistent, clean, and integrated copy of the ingested and parsed work(s). The information corpus 229 may also include knowledge graphs generated from the ingested work(s). The data may be sourced from various operational systems. Data stored in the information corpus 229 may be structured in a way to specifically address analytic requirements. For example, the information corpus 226 may store the ingested works as a plurality of knowledge graphs in order to make inconsistency identification easier. In some embodiments, the information corpus 229 may be a relational database.

In some embodiments, the natural language processing system 212 may include a consistency checker module 230. The inconsistency checker module 230 may be a computer module that is configured to generate (or otherwise obtain) a target knowledge graph and a background knowledge graph, to compare the knowledge graphs to each other, and to identify, based on the comparison, inconsistencies in a target work. In some embodiments, the consistency checker module 230 may contain submodules. For example, the consistency checker module 230 may contain a knowledge graph generator 232, knowledge graph comparator 234, and an inconsistency identifier 236. The knowledge graph generator 232 may be configured to parse received works using the natural language processor 214 and related subcomponents 216-222. The knowledge graph generator 232 may then generate, from the parsed works, a target knowledge graph and a background knowledge graph. Each knowledge graph may consist of a plurality of nodes (each relating to a different concept) and edges (each relating to a different relationship between a pair of concepts). In some embodiments, the knowledge graph generator 232 may use a search application (not shown) to search a set of corpora (e.g., data sources 228) to identify the concepts and relationships between the concepts to generate knowledge graphs.

The knowledge graph comparator 234 may be configured to compare knowledge graphs to each other. In some embodiments, the knowledge graph comparator 234 may prompt a user (such as an author of a target work) to select a background knowledge graph to which a target knowledge graph is to be compared, for example, from a drop-down menu. The knowledge graph comparator 234 may use graph comparison techniques, such as fuzzy logic, in making the knowledge graph comparisons.

The inconsistency identifier 236 may be a computer module that is configured to identify potential inconsistencies in the target work based on the knowledge graph comparisons made by the knowledge graph comparator 234. The inconsistency identifier 236 may analyze overlaps or gaps in knowledge graph overlays in order to identify concepts (nodes) or relationships (edges) that are found in one of a target knowledge graph and a background knowledge graph and not in the other of the two. For each such potential inconsistency identified, the inconsistency identifier may store the potential inconsistency, along with supporting evidence, for later presentation to a user via the inconsistency notifier 226, which may communicate with a notification receiver module (such as module 111 of FIG. 1).

Figure 3:
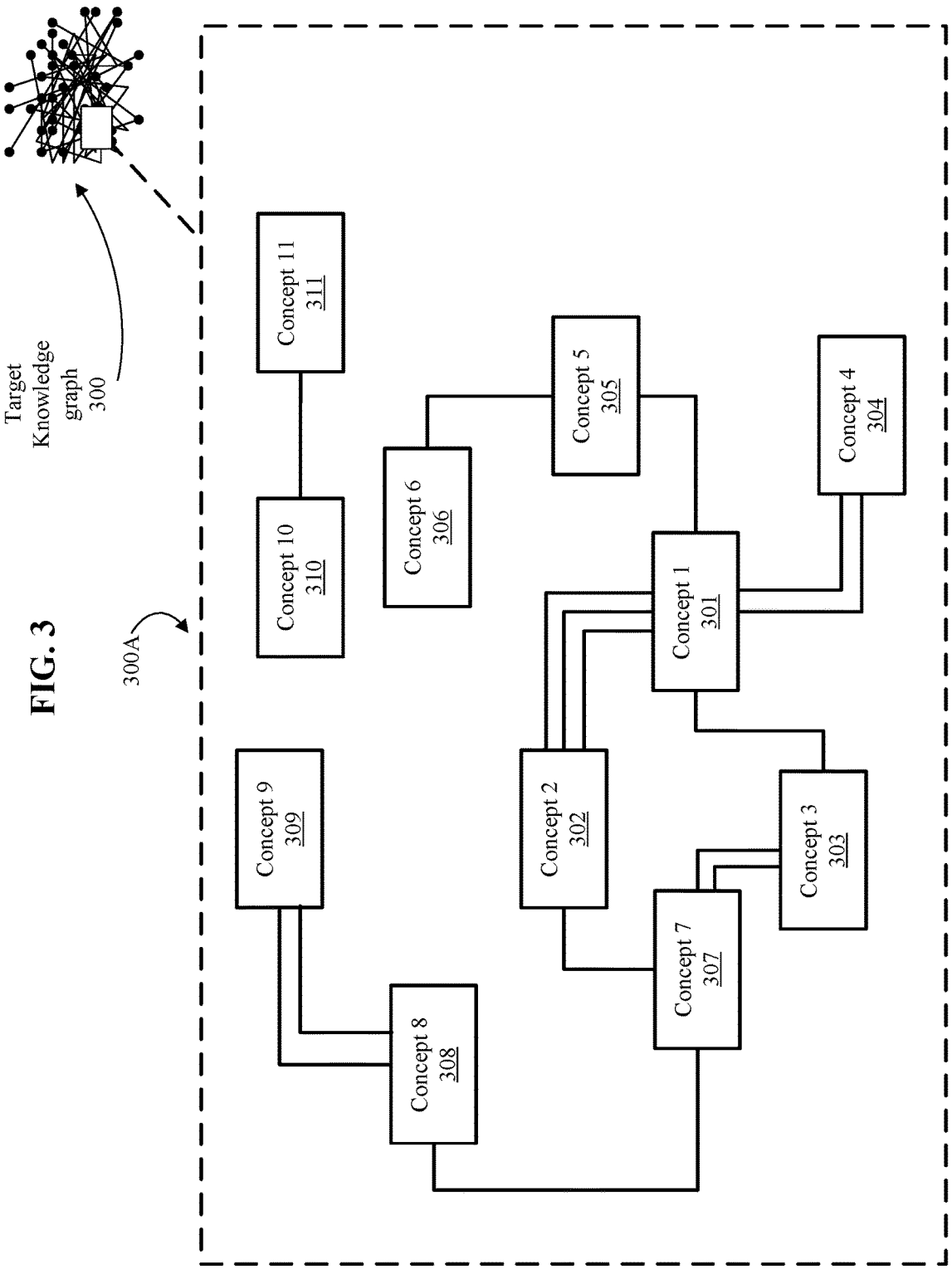
FIG. 3 illustrates a close-up view of a portion of an exemplary target knowledge graph for a target work, in accordance with embodiments of the present disclosure.

FIG. 3 illustrates a close-up view of a portion 300A of an exemplary target knowledge graph 300 for a target work, in accordance with embodiments of the present disclosure. The target work may be a work that is to be checked for consistency with other works (e.g., background works) within, for example, a narrative universe. The close-up view of the portion 300A includes eleven nodes 301-311, with each node relating to a different concept. The nodes 301-311

(also referred to herein as target nodes when discussed in reference to a target knowledge graph of which they are part) are connected by edges (e.g., target edges) that represent connections (e.g., relationships) between the concepts. For example, if two connected concepts correspond to characters in a target work, a target edge connecting them may represent that the characters are siblings. A computer system may generate the target knowledge graph 300 using natural language processing techniques, such as those described herein.

In some embodiments, the number of edges connecting two concepts within a single knowledge graph may correspond to a level of relatedness of the concepts. For example, concept 1 301 and concept 2 302 are connected with three target edges, whereas concept 1 301 is connected to concept 5 305 by a single target edge. This may indicate that concept 1 301 and concept 2 302 are more closely related than concept 1 301 and concept 5 305 within the content of the target work. Furthermore, in some embodiments, the level of relatedness of two concepts represented within a single knowledge graph may be based on the length of the shortest path (e.g., fewest number of edges) between the nodes representing the concepts. Also, the computer system may consider the number of other concepts that the two concepts are both connected to in determining their relatedness to each other.

In some embodiments, the nodes 301-311 may be generated using "fuzzy logic" and/or concept matching. This may be done to ensure that different words or phrases relating to the same concept are included in a single node. For example, a target work may refer to a character's "pet," "dog," and "german shepherd" at different points. A computer system using natural language processing techniques and fuzzy logic may determine that all three words refer to the same concept. Accordingly, all three terms may be represented in the knowledge graph using a single target node, and any target edges between any of the three terms and other concepts may connect to that target node.

In some embodiments, nodes can be weighted according to their importance. This may be represented in the target knowledge graph 300 by, for example, making the target nodes 301-311 larger or smaller. Nodes may be weighted according to the number of edges that connect to the nodes. In various embodiments, the target nodes 301-311 may be weighted according to the importance of the concepts they represent. For example, concepts relating to natural elements (e.g., time of day) may be weighted less than concepts relating to actors (e.g., characters) and events (e.g., a wedding or battle). Edges may similarly be weighted based on relative importance. Further, in some embodiments, the computer system may generate a significance score for a particular concept based on one or more factors, such as the number and/or weight of edges connecting to that particular concept. For example, concept 1 301 may have a high significance score because it is connected to a relatively large number of target edges.

Figure 4:
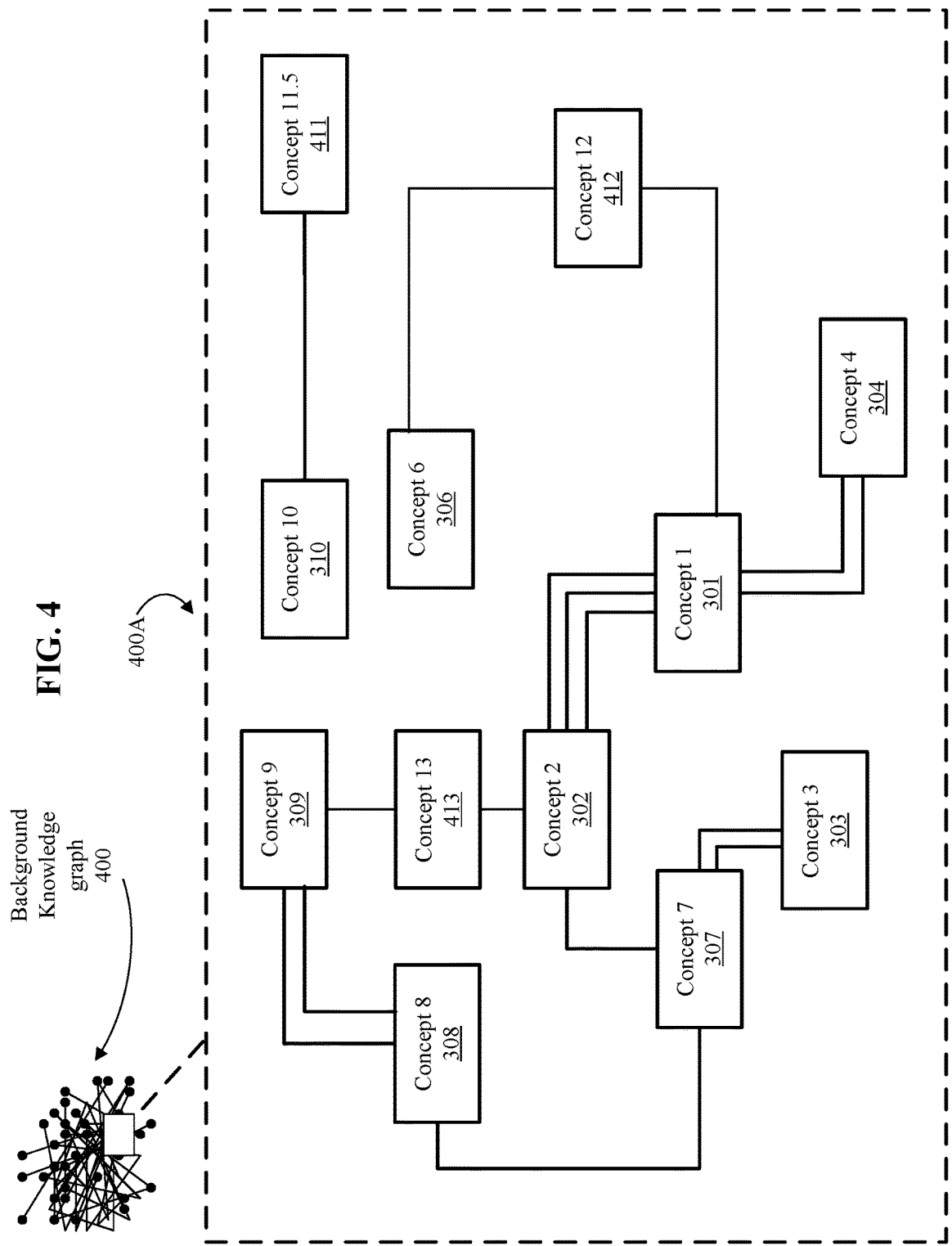
FIG. 4 illustrates a close-up view of a portion of an exemplary background knowledge graph for a set of background works, in accordance with embodiments of the present disclosure.

FIG. 4 illustrates a close-up view of a portion 400A of an exemplary background knowledge graph 400 for a set of background works, in accordance with embodiments of the present disclosure. The set of background works may include, for example, one or more earlier created works against which a newly created target work is to be checked for consistency. For another example, the set of background works may include a plurality of works of fiction that have overlapping characters and plot elements with each other, and the target work may be a work of fiction that has overlapping characters and plot elements with that plurality of works. The background knowledge graph may be constructed and analyzed using the same or similar techniques as those described with reference to the target knowledge graph 300 of FIG. 3. In some embodiments, a target work may be created after an associated background work; however, this may not always be true. For instance, in some embodiments, a target work may be created before, or contemporaneously with, a set of background works to which it is compared.

The close-up view of the portion 400A of the background knowledge graph 400 includes twelve nodes total. The twelve nodes and several edges (also referred to herein as background nodes and background edges, respectively, when discussed in reference to a background knowledge graph of which they are part) include nine background nodes (301-304 and 306-310) that are also included in the portion 300A of FIG. 3 and three background nodes (411, 412, and 413) that are not included in the portion 300A. This may serve to represent that the background work includes at least nine concepts (e.g., characters) that are also included in the target work and at least three concepts that are not included in the target work.

A computer system may generate the background knowledge graph 400 using natural language processing techniques, such as those described herein, on a set of background works. In some embodiments, for the purpose of generating the background knowledge graph 400 multiple background works may be analyzed together as though they are one large background work. Further, a previously generated background knowledge graph may be further refined, for example, by adding new background works as they are discovered or by eliminating background works that are deemed unreliable.

Figure 5:
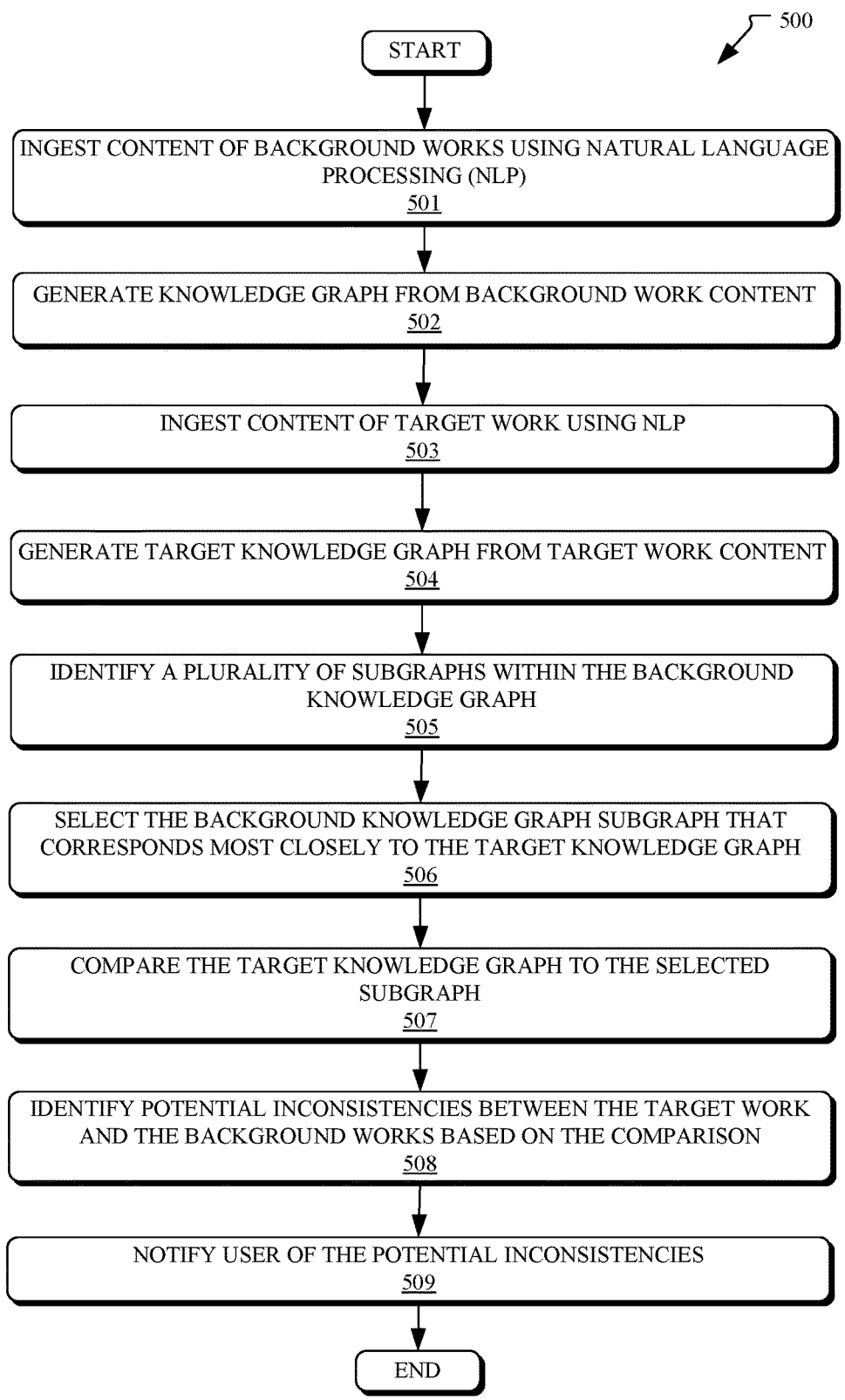
FIG. 5 illustrates a flowchart of an example method for notifying a user of potential inconsistencies in a target work, in accordance with embodiments of the present disclosure.

FIG. 5 illustrates a flowchart of an example method 500 for notifying a user of potential inconsistencies in a target work, in accordance with embodiments of the present disclosure. The method 500 may be performed by a computer system (or more specifically, a processor thereof), such as the host device 112 (shown in FIG. 1). The method 500 may begin at operation 501, where the computer system may ingest content of background works using natural language processing modules.

Natural language processing, as discussed herein, may incorporate any relevant natural processing techniques including, without limitation, those techniques discussed in reference to modules 216-222 in FIG. 2. For example, in embodiments, the natural language processing techniques may include analyzing syntactic and semantic content in the background works. The natural language processing techniques may be configured to parse structured data (e.g., tables, graphs) and unstructured data (e.g., textual content containing words, numbers). In certain embodiments, the natural language processing techniques may be embodied in software tools or other programs configured to analyze and identify the semantic and syntactic elements and relationships present in and between the background works. More particularly, the natural language processing techniques can include parsing the grammatical constituents, parts of speech, context, and other relationships (e.g., modifiers) of the background works. The natural language processing techniques can be configured to recognize keywords, contextual information, and metadata tags associated with words, phrases, or sentences related to concepts (e.g., actors, characters, etc.). The syntactic and semantic elements can include information such as word frequency, word meanings, text font, italics, hyperlinks, proper names, noun phrases, parts-of-speech, or the context of surrounding words. Other syntactic and semantic elements are also possible.

After ingesting the content of the background works at operation 501, the computer system may generate a background knowledge graph for the set of background works at operation 502. The background knowledge graph may have the same or similar characteristics and/or appearance as the background knowledge graph 400 discussed in reference to FIG. 4. In some embodiments, for example, the background knowledge graph may include a plurality of background nodes and background edges. The background nodes may relate to concepts found in the background works, such as actors, characters, themes, and/or actions. The background nodes may be linked together with background edges to represent a connection between the background nodes. In some embodiments, actions may also be represented by edges.

In some embodiments, the background knowledge graph may be generated by parsing the background works to identify subject-predicate-object triplets. In some embodiments, this may involve analyzing parse trees generated by a natural language processor, such as the natural language processor 214 (shown in FIG. 2). The subject and objects in the sentence may be represented by nodes in a knowledge graph, whereas the predicate may be represented by an edge. For example, a sentence in a book might read "George II is the King of England." A natural language processing system may parse this sentence to identify a subject ("George II"), a predicate ("is the"), and an object ("King of England"). Based on the parsing, the natural language processing system may generate nodes for "George II" and "King of England." The nodes may be connected by an edge denoting a relationship between the nodes (i.e., indicating that George II is the King of England).

Per operation 503, the computer system may ingest content of a target work using natural language processing. Once the target work is ingested and per operation 504, the computer system may generate a target knowledge graph for the target work. Operations 503 and 504 may be done in the same or substantially similar manner to the ingestion of background works and generation of a background knowledge graph, as described in reference to operations 501 and 502, respectively. Once generated, the target knowledge graph may have the same or similar characteristics and/or appearance as the target knowledge graph 300 discussed in reference to FIG. 3.

Per operation 505, the computer system may identify a plurality of subgraphs within the background knowledge graph. Each subgraph may be a portion of the background knowledge graph and these portions may, in some embodiments, overlap with each other. Identifying the subgraphs may involve dividing the background knowledge graph based on, for example, major plot element shifts, historical time periods, or geographic areas. For example, one background knowledge graph on the topic of United States history might be divided into subgraphs by century (e.g., one subgraph for each of pre-19$^{th}$ century, 19$^{th}$ century, and 20$^{th}$ century).

Per operation 506, a background knowledge graph subgraph that corresponds most closely with the target knowledge graph may be selected. In some embodiments, a subgraph may be deemed to correspond more closely with the target knowledge graph in instances where the subgraph has more elements (e.g., nodes or edges) that correspond with elements of the target knowledge graph. Techniques discussed herein, such as fuzzy logic, concept matching, and similarity scoring may be utilized in making this selection. Further, in some embodiments, operations 505 and 506 may be performed together, with the target knowledge graph being used as the basis for identifying background knowledge graph subgraphs that are likely to be closely related to the target knowledge graph.

Per operation 507, the computer system may compare the target knowledge graph to the selected subgraph. This comparison may be performed, in some embodiments, by generating an overlay of the target knowledge graph upon the selected subgraph (or vice versa). In some embodiments, this overlay may be displayed to a user, so that the user can visualize the inconsistencies in the two graphs. In some embodiments, the overlay may be used by the computer system for comparison purposes without being displayed to the user.

As part of the comparison, target nodes may be matched to (e.g., mapped onto) corresponding background nodes and target edges may be matched to corresponding background edges. This matching may be performed using techniques described herein, such as concept matching or fuzzy logic. For example, a target node representing the concept of mountain lion could be matched to a background node representing the concept of cougar (because they are different names for the same animal). Depending on how closely related an element of a target knowledge graph is to a corresponding element in a background knowledge graph, the overlaying of the two elements could be represented differently. For example, a target edge that represents the exact same or substantially the same relationship as is represented by a corresponding background edge may be treated as exactly the same as the background edge for comparison purposes. For another example, a target node that represents a concept that is only somewhat similar to a concept represented by a background node may be treated as only somewhat overlapping for comparison purposes. In some embodiments, a relatedness score may be used as a measure of the relatedness of two elements represented in different knowledge graphs. Relatedness scores may, in some embodiments, represent the semantic similarity of two concepts (e.g., with semantically similar concepts having high relatedness scores). Furthermore, whether two concepts or relationships are considered the same for matching purposes may, in some embodiments, depend on whether those concepts or relationships have relatedness score that exceed a relatedness threshold.

Per operation 508, potential inconsistencies between the target work and the set of background works may be identified based on the comparison of the knowledge graphs. Potential inconsistencies may be represented in an overlay, for example, by highlighting portions where the target knowledge graph and the background knowledge graph do not match. Per operation 509, the user may be notified of the potential inconsistencies. The user may then be prompted to make corrections in the target work in order to correct the inconsistencies.

While some embodiments of an example method 500 are described herein, it is contemplated that many other variants on these embodiments fall within the scope of this disclosure. More specifically, in some embodiments, one or more of the knowledge graphs may be obtained by means other than content ingestion and knowledge graph generation by the computer system. For example, knowledge graphs may be generated by third parties, received by the computer system, and then stored in memory until the knowledge graph is needed. Furthermore, in some embodiments, only selected portions of target knowledge graphs may be compared to portions of background knowledge graphs.

An example scenario involving the use of an embodiment of the method 500 is described herein. In this example a user may scan a textual work of authorship, such as a book, using a scanner or other input device coupled to a computer system. The computer system may use optical character recognition to convert the book to machine-encoded text. The computer system may use natural language processing modules that apply natural language processing techniques on the machine-encoded text to ingest it and then the modules of the computer system may generate a target knowledge graph based on the ingested content of the book. The computer system may then retrieve from storage a previously generated background knowledge graph that has content that is associated with the content of the book. The computer system may then identify potential inconsistencies by comparing the knowledge graphs to each other. The computer system may then transmit a list of the potential inconsistencies to the user, for example, by sending it to an output device such as a user's remote display device. The user may then rewrite a relevant portion of the target work so as to avoid the potential inconsistencies.

Figure 6:
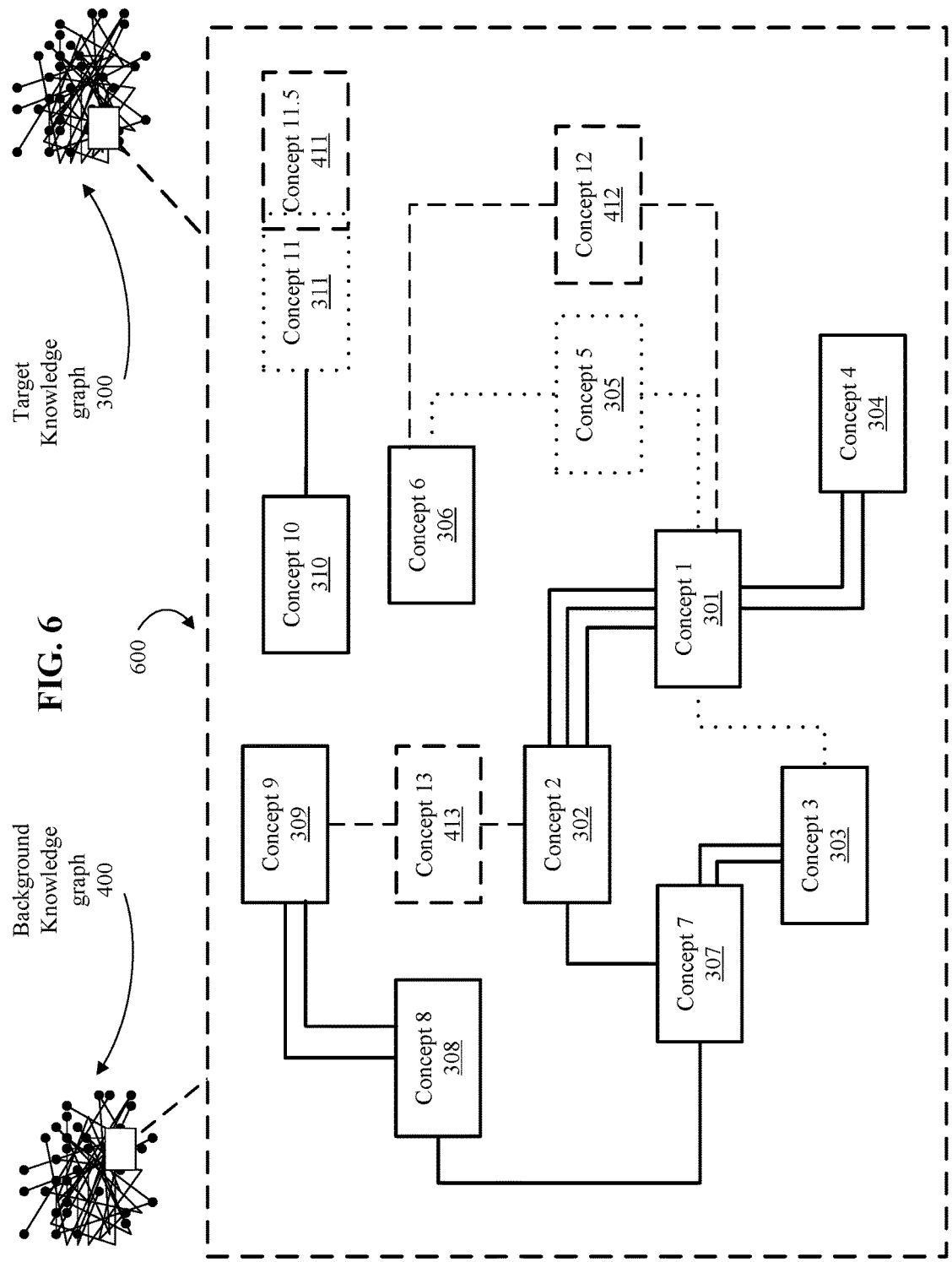
FIG. 6 illustrates a close-up view of an overlay of the exemplary background knowledge graph of FIG. 4 upon the exemplary target knowledge graph of FIG. 3, in accordance with embodiments of the present disclosure.

FIG. 6 illustrates a close-up view of an overlay 600 of the exemplary background knowledge graph 400 of FIG. 4 upon the exemplary target knowledge graph 300 of FIG. 3, in accordance with embodiments of the present disclosure. The overlay 600 may be created and utilized in accordance with operations of the method 500 of FIG. 5. Within the overlay 600, solid lines may serve to represent elements (e.g., nodes, edges) that are found in both the background knowledge graph 400 and the target knowledge graph 300, dashed lines may serve to represent background elements without corresponding target elements, and dotted lines may serve to represent target elements without corresponding background elements. These particular types of lines are used for example purposes only and should not be construed as limiting. In some embodiments, other visual indications of differences (size, color, thickness, etc.) may serve to indicate different types of correspondence between elements. Furthermore, in some embodiments, the overlay 600 may not be a visual object per se and may instead be represented only by data within the computer system itself (e.g., in the form of a relational database).

As shown in the overlay 600, there are several differences between the target knowledge graph 300 and the background knowledge graph 400. More specifically, a first difference is represented by the dotted line edge linking the concept 3 303 to the concept 1 301, which represents that there is a relationship between these pair of concepts that is found in the content of the target work but not in the content of the background work.

A second difference is represented by the dashed lines associated with concept 13 413, which represents that concept 13 413 is found in the content of the background work but not in the content of the target work. This representation could occur, for example, in a situation where a writer writes a speech (target work) about a famous battle, then a computer system is used to compare the speech to encyclopedia articles (background works) about the battle. In this situation, concept 9 309 and concept 2 302 could represent famous heroes of the battle, both of whom the writer included in his speech, and concept 13 413 could represent the military unit of the heroes, which the writer neglected to include in his speech. The writer may be notified of this inconsistency (forgetting to include the military unit) and may address it by adding a reference to the military unit in his speech.

A third difference between the target knowledge graph 300 and the background knowledge graph 400 is represented in the overlay 600 by the dashed lines associated with the concept 12 412 and the dotted lines associated with the concept 5 305. This may represent that concept 12 412 is found in the content of the background work but not in the content of the target work, and that concept 5 305 is found in the content of the target work but not in the content of the background work. This representation could occur, for example, in a scenario when a writer writes a pair of novels about people in a big family. The first novel (the background work) states that concept 12 412 represents a character who is married to a person represented by concept 1 301 and who is a sibling to another person represented by concept 6 306. In the second novel (the target work), the writer accidentally changes the name of the character, thereby causing the target knowledge graph to represent the character as concept 5 305 (rather than concept 12 412). By comparing the knowledge graphs, the computer system catches the inconsistency and notifies the writer. The writer is then able to fix the name of the character in the second novel.

A fourth difference between the target knowledge graph 300 and the background knowledge graph 400 is represented in the overlay 600 by dashed lines associated with concept 11.5 411 partially overlapping the dotted lines associated with concept 11 311. This may represent, for example, that concept 11.5 411 and concept 11 311 have a middling relatedness score. Specifically, the middling relatedness score may indicate that the two concepts are semantically similar enough that they should be recognized as closely related but are not so semantically similar that they should be represented together by a single node.

Figure 7:
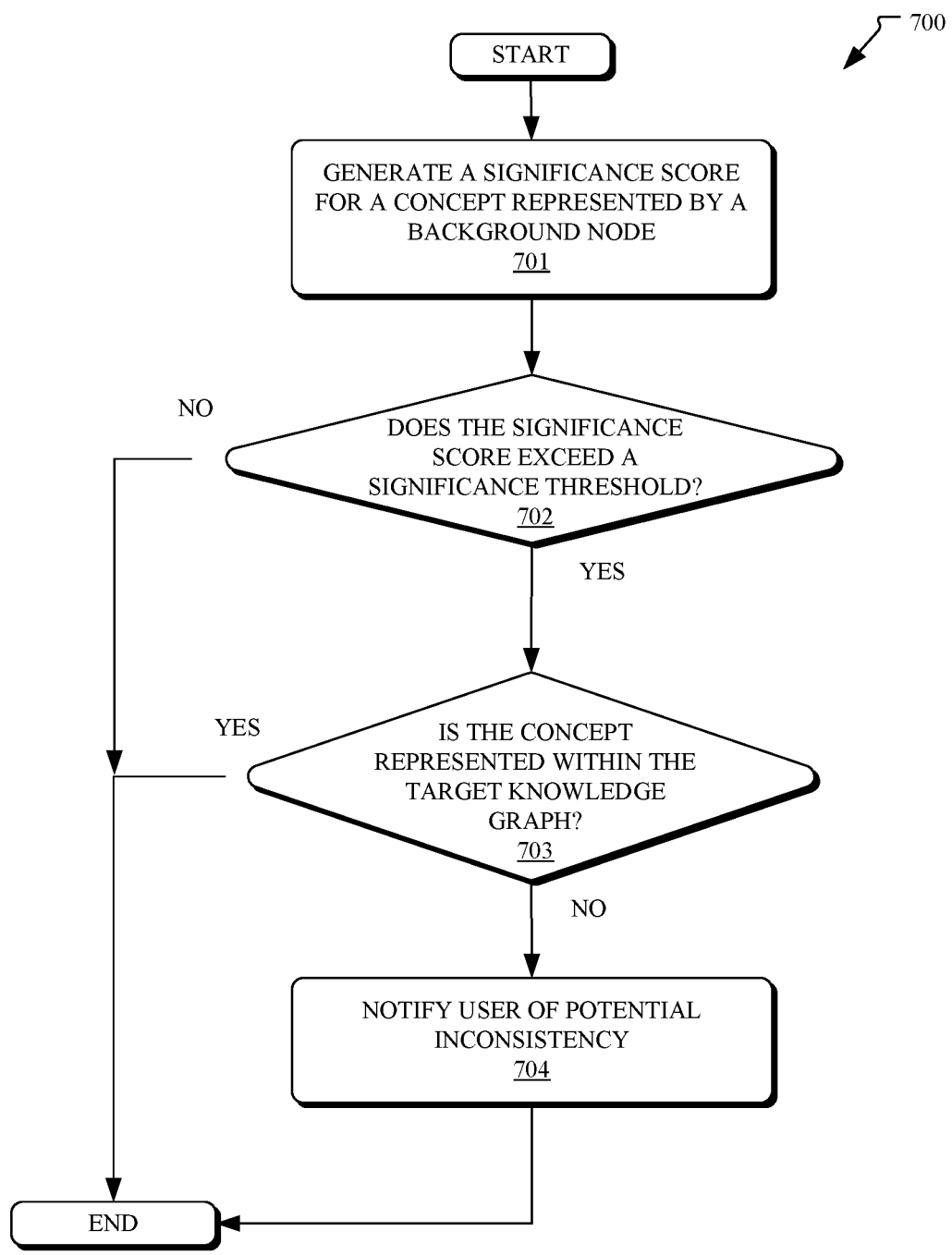
FIG. 7 illustrates a flowchart of an example method for determining if a significant concept is missing from a target work, in accordance with embodiments of the present disclosure.

FIG. 7 illustrates a flowchart of an example method 700 for determining if a significant concept is missing from a target work, in accordance with embodiments of the present disclosure. In some embodiments, operations of the method 700 may be performed as part of the comparing, identifying, and notifying included in operations 507-509 of method 500 (shown in FIG. 5). The method 700 may begin at operation 701, where a computer system may generate a significance score for a concept represented by a background node.

In some embodiments, a significance score for a concept represented by a node may be based on the number of edges connecting the node to other nodes in a knowledge graph. The more edges that connect that node to other nodes, the more important that node may be, and the higher the significance score of the represented concept. Further, in some embodiments, the significance score for a node may be further affected by how closely related the node is to other nodes that are known to be significant. The fewer degrees of separation (e.g., the fewer the number of edges needed to link) between the node and the known significant node, the higher the significance score the node may have.

After calculating a significance score for the background node at operation 701, the computer system may determine whether the significance score exceeds a significance threshold at decision block 702. The significance threshold may be the minimum significance score that a node must achieve in order for the computer system to determine that the concept represented by the node is significant to the relevant work (or set of works) of which it is part. Secondary or immaterial concepts of the background works that have below significance threshold scores may not be important enough to the subject matter at issue in a narrative universe to need to be included in the target work (i.e., they can be skipped in the content of the target work). However, background concepts with above significance threshold scores may be important enough to the subject matter at issue to need to be included in target work (i.e., they should be included in the content of the target work).

The significance threshold may be set by a user or system administrator. In some embodiments, the threshold may be set automatically by the computer system based on historical data and the user's responses. For example, if a user consistently provides feedback indicating that insignificant concepts are being labeled as significant, the computer system may adjust the significance threshold so that fewer concepts are deemed significant.

If the computer system determines that the significance score does not exceed a threshold, the method 700 may end. If, however, the computer system determines that the significance score for the concept represented by the background node exceeds the threshold at decision block 702, the method 700 may progress to decision block 703, where the computer system may determine whether the concept is represented (e.g., shown by a target node) within the target knowledge graph. If the concept is represented in the target knowledge graph, the method 700 may end. If, however, the computer system determines that the concept is not represented within the target knowledge graph, then, per operation 704, the user may be notified of the potential inconsistency.

An example scenario employing an embodiment of the method 700 is described herein. In this scenario, an author writes a biography about the early life of Abraham Lincoln. A late draft of the work is processed by a computer system to generate a target knowledge graph about the biography. A background knowledge graph is also generated by the computer system based on other biographies written about Lincoln. The computer system then compares the two knowledge graphs. As part of the comparison, the computer system identifies a background node in the background knowledge graph that represents Sarah Bush Johnston (Lincoln's stepmother). The computer system calculates a significance score for the Johnston background node. Because the Johnston background node is connected to several edges linking it directly to a background node representing Lincoln himself, the Johnston background node is given high significance score. The computer system then determines that the significance score exceeds a significance threshold. In response to the threshold being exceeded, the computer system attempts to identify a corresponding target node representing Sarah Bush Johnston in the target knowledge graph. The computer system, upon finding no such matching target node, notifies the author of the potential inconsistency. The author responds to the notice by adding a few pages to the biography that describe Lincoln's relationship with Johnston.

Figure 8:
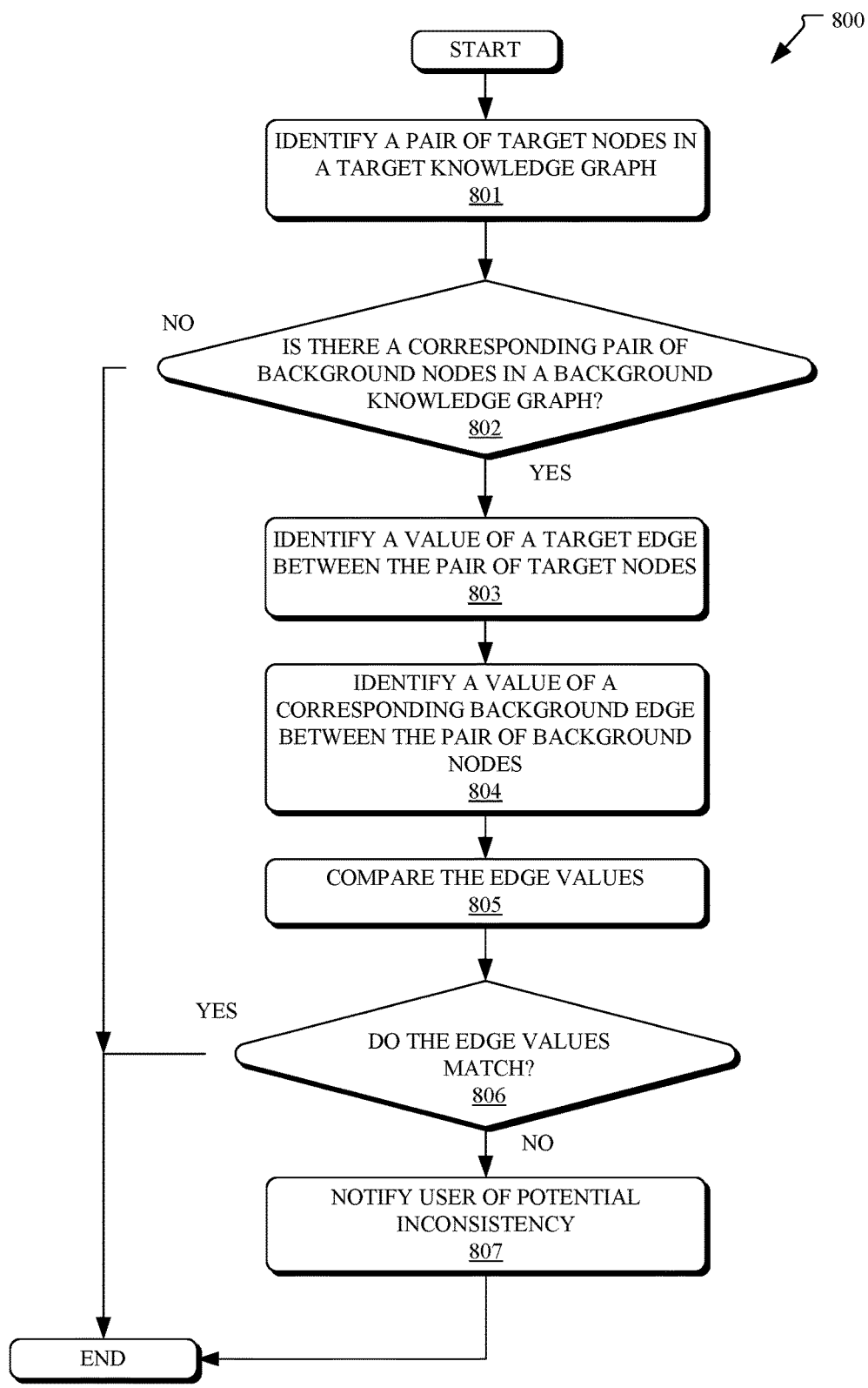
FIG. 8 illustrates a flowchart of an example method for determining if a relationship is improperly represented in a target work, in accordance with embodiments of the present disclosure.

FIG. 8 illustrates a flowchart of an example method 800 for determining if a relationship is improperly represented in a target work, in accordance with embodiments of the present disclosure. In some embodiments, operations of the method 800 may be performed as part of the comparing, identifying, and notifying included in operations 507-509 of method 500 (shown in FIG. 5). The method 800 may begin at operation 801, where a computer system may identify a pair of target nodes in a target knowledge graph. As used herein a pair of nodes may refer to two nodes in a knowledge graph that have at least one edge directly linking them together. Per decision block 802, the computer system may determine whether there is a corresponding pair of background nodes in the background knowledge graph. If there is not a corresponding pair of background nodes, then the method 800 may end. If, however, the computer system determines that there is a corresponding pair of background nodes, then, per operation 803, the computer system may identify a value of a target edge between the pair of target nodes. Per operation 804, the computer system may identify a value of a corresponding background edge between the pair of background nodes.

Per operation 805, the edge values may be compared. Per decision block 806, the computer system may determine whether the edge values match (e.g., are the same or substantially similar). If the edge values match, then the method 800 may end. If, however, the edge values do not match, then the user may be notified of the potential inconsistency per operation 807.

Figure 9:
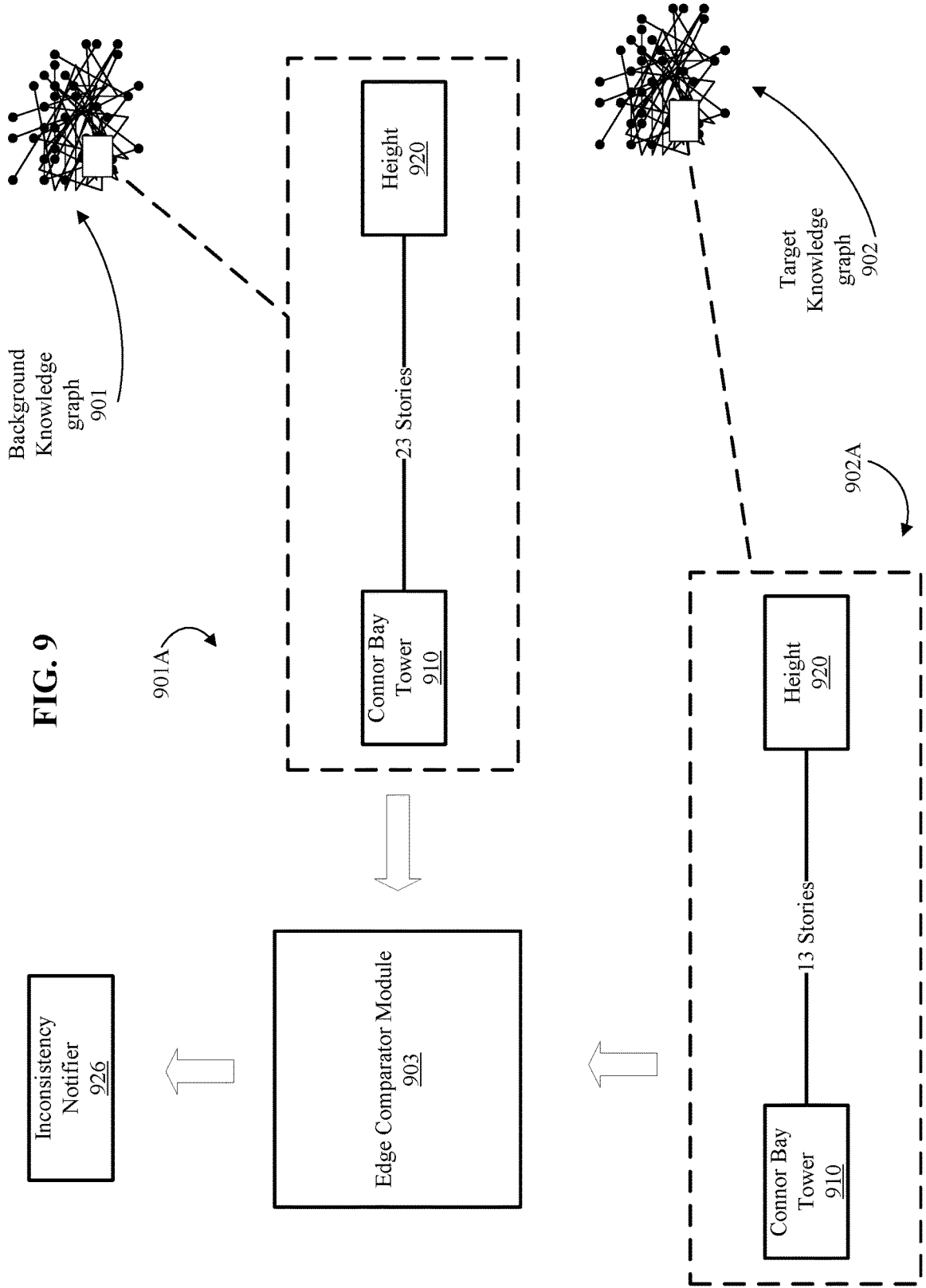
FIG. 9 illustrates a diagram of an example scenario wherein a computer system performs an embodiment of the method of FIG. 8 to determine if a relationship is improperly represented in a target work, in accordance with embodiments of the present disclosure.

FIG. 9 illustrates a diagram of an example scenario wherein a computer system performs an embodiment of the method 800 of FIG. 8 to determine if a relationship is improperly represented in a target work, in accordance with embodiments of the present disclosure. In this example scenario, a new book (target work) is written as fourth installment for a fictional detective series. The prior three books are used to generate a background knowledge graph 901 and the new book is used to generate a target knowledge graph 902. In this example the method may be performed by a computer system utilizing at least an edge comparator module 903, which may be a subcomponent of the knowledge graph comparator module 232 of FIG. 2, and an inconsistency notifier 926, which may be the same or substantially similar to the inconsistency notifier module 226 of FIG. 2.

In this example, a close-up view of a portion 901A of the background knowledge graph 901 shows a background node 910 that represents the Connor Bay Tower, a fictional building where the star detective of the series has an office. The view of the portion 901A also shows a background node 920 representing the concept of height. These background nodes are linked by a background edge that has a value of twenty-three stories. Thus, the portion 901A represents that the Connor Bay Tower is twenty-three stories in height. In contrast with the portion 901A, the portion 902A of the target knowledge graph 902 has a target edge value of thirteens stories. This means that portion 902A represents the height of Connor Bay Tower as only thirteen stories.

In this example, the pair of target nodes 910, 920 are identified by the computer system in the target knowledge graph 902. The computer system determines that there is a corresponding pair of background nodes 910, 920 in the background knowledge graph 901. The computer system identifies the value of the relevant target edge as thirteen stories and the value of the relevant background edge as twenty-three stories. These edge values are then compared by the edge comparator module 903. The computer system determines that the edge values are different (twenty-three stories versus thirteen stories) and notifies the author, via the inconsistency notifier 926, of this discrepancy. With this notification in hand the author may be able to change the listed height of the Connor Bay Tower in the new book in order to make the height consistent with the height listed in the other books in the series.

Figure 10:
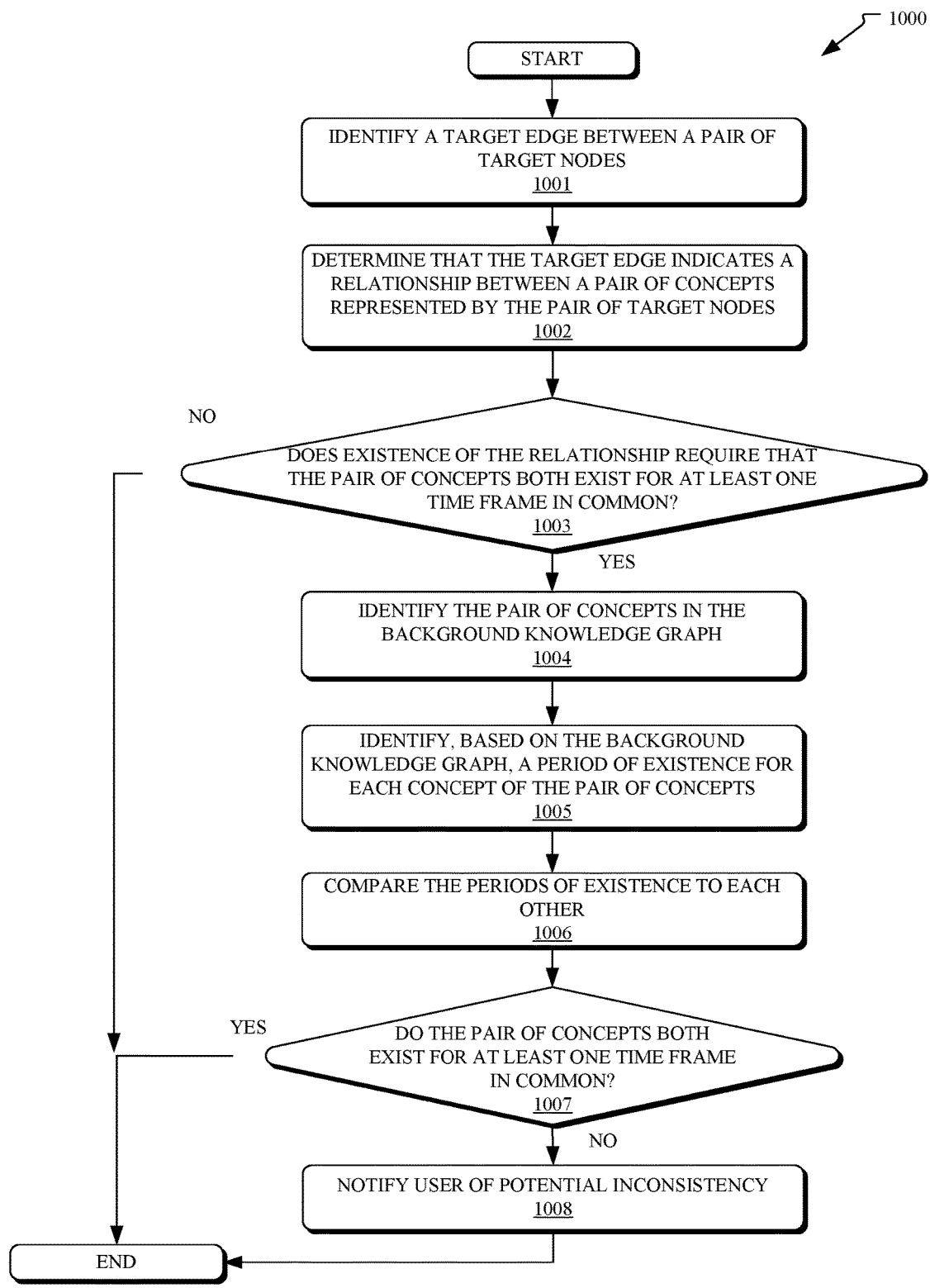
FIG. 10 illustrates a flowchart of an example method for determining whether a target work includes a timing inconsistency evidencing that a relationship is improperly represented in a target work, in accordance with embodiments of the present disclosure.

FIG. 10 illustrates a flowchart of an example method 1000 for determining whether a target knowledge graph includes timing inconsistency evidencing that a relationship is improperly represented in a target work, in accordance with embodiments of the present disclosure. In some embodiments, operations of the method 1000 may be performed as part of the comparing, identifying, and notifying included in operations 507-509 of method 500 (shown in FIG. 5). The method 1000 may begin at operation 1001, where a computer system identifies a target edge between a pair of target nodes in a target knowledge graph. Per operation 1002, the computer system may determine that the target edge indicates a relationship between a pair of concepts represented by the pair of target nodes. Per decision block 1003, the computer system may determine whether the relationship is of a type that necessarily requires that the pair of target nodes both exist for at least one time frame in common (e.g., the existence of shared time period is a condition precedent for the existence of the relationship). In making this determination, the computer system may use natural language processing or other techniques to determine whether the edge represents such a relationship type. For example, many action verbs that connect two noun concepts (represented by nodes) may require that the two nouns exist together for at least a moment in time (e.g., in the phrase "Fred shook hands with Jason," the action of shaking hands implies that Fred and Jason must be contemporaries). In some embodiments, two concepts may be deemed to exist in a time frame in common if there is at least some overlap in their respective times between their creations (e.g., births, establishments, generations) and their destructions (e.g., deaths, dissolutions).

If, per decision block 1003, the computer system determines that the relationship between the pair of concepts does not require the concepts to exist together, then the method 1000 may end. This may occur for example, when edges represent linking verbs that do not require an action to occur at a specific place in time (e.g., "Jack reminds people of Mark", "Matt was taller than Sarah"). If, however, the computer system determines in decision block 1003 that the relationship between the pair of concepts requires the concepts to exist together, then the method may proceed to operation 1004. Per operation 1004, the computer system may identify the pair of concepts in a background knowledge graph (e.g., as a pair of background nodes). The computer system, per operation 1005, may use the background knowledge graph to identify a period of existence for each concept of the pair of concepts. This may involve, in some embodiments, using natural language processing to analyze (e.g., trace) the background edges that connect to the background nodes that represent the pair of concepts in order to identify the dates of creation and destruction for each concept.

Per operation 1006, the computer system may compare the periods of existence to each other. Per decision block 1007, the computer system may determine, based on the comparison, if the pair of concepts exist for at least one time frame in common. This may involve, in some embodiments, determining if there is any overlap in the periods of existence. If the computer system determines that the concepts do have overlapping periods of existence, then the method may end. If, however, the computer system determines that there is no such overlap, then, per operation 1008, the user may be notified of the potential inconsistency.

Figure 11:
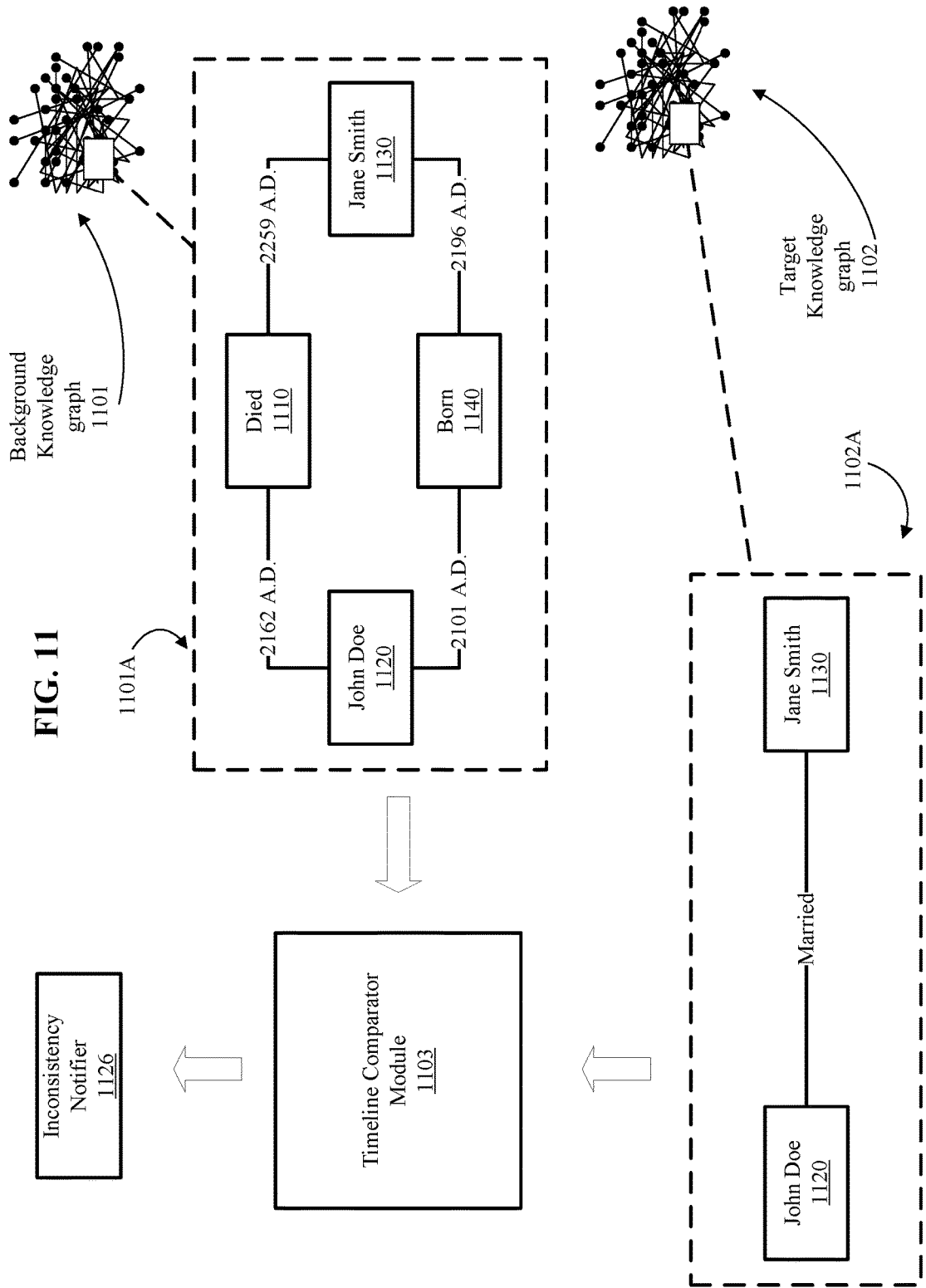
FIG. 11 illustrates a diagram of an example scenario wherein a computer system performs an embodiment of the method of FIG. 10 to determine if a target knowledge graph includes a timing inconsistency evidencing that a relationship is improperly represented in a target work, in accordance with embodiments of the present disclosure.

FIG. 11 illustrates a diagram of an example scenario wherein a computer system performs an embodiment of the method 1000 of FIG. 10 to determine if a target knowledge graph includes a timing inconsistency evidencing that a relationship is improperly represented in a target work, in accordance with embodiments of the present disclosure. In this example scenario, a new screenplay (target work) is written for a fifth movie of a science-fiction series that is set in the future. The prior four movies are used to generate a background knowledge graph 1101 and the new screenplay is used to generate a target knowledge graph 1102. In this example, the method may be performed by a computer system utilizing at least a timeline comparator module 1103, which may be a subcomponent of the knowledge graph comparator module 232 of FIG. 2, and an inconsistency notifier 1126, which may be the same or substantially similar to the inconsistency notifier module 226 of FIG. 2.

In this example, a close-up view of a portion 1101A of the background knowledge graph 1101 shows a background node 1120 that represents John Doe, a popular character in the science fiction series, and another background node 1130 that represents Jane Smith, a lesser character that showed up in a couple of the movies. The view of the portion 1101A also shows a background node 1110 representing the concept of having died and a background node 1140 representing the concept of having been born. Four edges connect these four background nodes 1110, 1120, 1130, and 1140. A first background edge with a value of 2101 A.D. represents the year that John Doe was born. A second background edge with a value of 2196 A.D. represents the year that Jane Smith was born. A third background edge with a value of 2162 A.D. represents the year that John Doe died. And a fourth background edge with a value of 2259 A.D. represents the year that Jane Smith died.

Also included in this example is a close-view of a portion 1102A of the target knowledge graph 1102. In the portion 1102A, the target nodes 1120 and 1130 are linked by a target edge having a value of married. Thus, the portion 1102A represents that John Doe and Jane Smith were married (or described as married) in the new screenplay.

In this example embodiment of the method 1000, the computer system identifies the target edge between the pair of target nodes 1120, 1130 in the target knowledge graph 1102. The computer system determines that this edge indicates a relationship between the two concepts; specifically, that they are married. The computer system analyzes the type of relationship represented by the edge and determines that marriage is a type of relationship that requires the married individuals to exist in a time frame in common. The computer system then identifies the same pair of concepts as being represented by the background nodes 1120, 1130 in the background knowledge graph 1101. By analyzing the background edges of the portion 1101A, the computer system determines that John Doe has a period of existence spanning from 2101 A.D. to 2162 A.D. and that Jane Smith has a period of existence spanning from 2196 A.D. to 2259 A.D. The computer system compares these time periods to each other using the timeline comparator module 1103. Based on the comparison, the computer system determines that the time periods do not overlap. The computer system then notifies the screenwriter that the screenplay for the fifth movie contains the identified potential inconsistency with the other movies.

In some embodiments, methods described herein may be used to analyze relationships between concepts in order to identify complex potential inconsistencies in a target work. These complex potential inconsistencies may include, for example, the timing inconsistencies described herein. In addition, a computer system may be able to identify other types of potential inconsistencies by making inferences from certain relationships represented by edges in a knowledge graph. For example, the existence of certain types of relationships may imply that certain conditions are met. For some relationships, there may need to be several conditions that are met. For example, in the statement "Joe kicked John" the relationship of kicked may imply that a temporal condition is met (e.g., that Joe and John existed in a time period in common) and also that a geographic condition is met (e.g., that Joe and John existed in at least one geographic location in common). In testing the validity of the relationship to determine if the relationship is a potential inconsistency when compared to background works, these conditions may be checked (e.g., by reviewing a background knowledge graph) in order to confirm that they are actually met.

In some situations, there may be value in being able to estimate or infer when certain events occurred in a work or when certain relationships existed between concepts in the work. For example, this may be helpful when trying to identify periods of existence for concepts (or relationships) in operation 1005 of FIG. 10. In some embodiments, it may be possible to generate a timing estimate as a range (or window) of possible times. For example, if a background knowledge graph indicates that an event occurred while a relationship was in existence, a computer system may be able to infer that the event occurred at some point within a range beginning at the time when the relationship started and ending at the time when the relationship ended. In some situations, this time range could be added to the background knowledge graph as a property of the event.

Building on the above example, the time range may then be used for identifying potential inconsistencies. For example, if a target knowledge graph corresponding to the background knowledge graph indicates that the event occurred at a specific time, a check could be performed to determine whether the specified time is within the time range. If not, then the user could be notified of this potential inconsistency.

As discussed in more detail herein, it is contemplated that some or all of the operations of some of the embodiments of methods described herein may be performed in alternative orders or may not be performed at all; furthermore, multiple operations may occur at the same time or as an internal part of a larger process.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the various embodiments. As used herein, the singular forms "a," "an," and "the" are intended to include the plural forms as well, unless the context clearly indicates otherwise. It will be further understood that the terms "includes" and/or "including," when used in this specification, specify the presence of the stated features, integers, steps, operations, elements, and/or components, but do not preclude the presence or addition of one or more other features, integers, steps, operations, elements, components, and/or groups thereof. In the foregoing detailed description of exemplary embodiments of the various embodiments, reference was made to the accompanying drawings (where like numbers represent like elements), which form a part hereof, and in which is shown by way of illustration specific exemplary embodiments in which the various embodiments may be practiced. These embodiments were described in sufficient detail to enable those skilled in the art to practice the embodiments, but other embodiments may be used and logical, mechanical, electrical, and other changes may be made without departing from the scope of the various embodiments. In the foregoing description, numerous specific details were set forth to provide a thorough understanding the various embodiments. But, the various embodiments may be practiced without these specific details. In other instances, well-known circuits, structures, and techniques have not been shown in detail in order not to obscure embodiments.

Different instances of the word "embodiment" as used within this specification do not necessarily refer to the same embodiment, but they may. Any data and data structures illustrated or described herein are examples only, and in other embodiments, different amounts of data, types of data, fields, numbers and types of fields, field names, numbers and types of rows, records, entries, or organizations of data may be used. In addition, any data may be combined with logic, so that a separate data structure may not be necessary. The previous detailed description is, therefore, not to be taken in a limiting sense.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Although the present invention has been described in terms of specific embodiments, it is anticipated that alterations and modification thereof will become apparent to the skilled in the art. Therefore, it is intended that the following claims be interpreted as covering all such alterations and modifications as fall within the true spirit and scope of the invention.

What is claimed is:

1. A method comprising:
    obtaining, by a processor, a target knowledge graph generated based on content of a target work, the target knowledge graph including target nodes that represent concepts used within the target work and target edges between target nodes that represent links used within the target work to associate the concepts used within the target work to each other;
    obtaining, by the processor, a background knowledge graph generated based on content of at least one background work associated with the content of the target work, the background knowledge graph including background nodes that represent concepts used within the at least one background work and background edges between background nodes that represent links used within the at least one background work to associate the concepts used within the at least one background work to each other;
    comparing, by the processor, at least a portion of the target knowledge graph to at least a portion of the background knowledge graph; and
    identifying, based on the comparing and by the processor, a potential inconsistency between the at least one background work and the target work.

2. The method of claim 1, wherein the obtaining the target knowledge graph comprises:
    receiving the target work by an input device coupled to a computer system, the computer system having the processor and a memory storing one or more natural language processing modules executable by the processor to ingest the content of the target work;
    ingesting the content of the target work using the natural language processing modules; and
    generating the target knowledge graph using the ingested content of the target work.

3. The method of claim 1, further comprising:
    notifying, via an output device coupled to a computer system incorporating the processor, a user of the potential inconsistency, wherein a relevant portion of the target work is then rewritten to avoid the potential inconsistency.

4. The method of claim 1, wherein the comparing comprises:
using fuzzy logic to match target nodes with corresponding background nodes.

5. The method of claim 1, further comprising:
matching a pair of target nodes with a corresponding pair of background nodes;
matching, based on the matching the pair of target nodes with the corresponding pair of background nodes, a target edge between the pair of target nodes with a corresponding background edge between the corresponding pair of background nodes;
identifying a first value of the target edge and a second value of the background edge;
comparing, in response to the matching the target edge with the background edge, the first value and the second value; and
determining, based on the comparing the first value and the second value, that the first value and the second value are different,
wherein the potential inconsistency is identified based on the first value and the second value being different.

6. The method of claim of 1, further comprising:
identifying a target edge between a pair of target nodes;
determining that the target edge indicates a relationship between a pair of concepts represented by the pair of target nodes;
determining that existence of the relationship requires that the pair of concepts both exist for at least one time frame in common;
identifying the pair of concepts in the background knowledge graph;
identifying, based on the background knowledge graph, a period of existence for each concept of the pair of concepts;
comparing the periods of existence to each other; and
determining, based on the comparing the periods of existence, that the pair of concepts do not both exist for at least one time frame in common,
wherein the potential inconsistency is identified based on an inconsistency between the determination that the existence of the relationship requires that the pair of concepts both exist for at least one time frame in common and the determination that the pair of concepts do not both exist for at least one time frame in common.

7. The method of claim 1, wherein the identifying the potential inconsistency comprises:
generating a significance score for a first concept represented by a first background node;
determining that the significance score exceeds a significance threshold; and
determining, based on the comparing, that the first concept is not represented within the target knowledge graph.

8. The method of claim 1, wherein the at least one background work is a plurality of works of fiction that have overlapping characters and plot elements with each other, and wherein the target work is a work of fiction that has overlapping characters and plot elements with the plurality of works of fiction.

9. The method of claim 1, further comprising:
determining that a first subgraph of a plurality subgraphs of the background knowledge graph corresponds more closely with the target knowledge graph than remaining subgraphs of the plurality of subgraphs; and
selecting, based on the determining, the first subgraph as the at least the portion of the background knowledge graph.

10. A computer program product comprising a computer readable storage medium having program instructions embodied therewith, the program instructions executable by a processor to cause the processor to perform a method comprising:
obtaining, by the processor, a target knowledge graph generated based on content of a target work, the target knowledge graph including target nodes that represent concepts used within the target work and target edges between target nodes that represent links used within the target work to associate the concepts used within the target work to each other;
obtaining, by the processor, a background knowledge graph generated based on content of at least one background work associated with the content of the target work, the background knowledge graph including background nodes that represent concepts used within the at least one background work and background edges between background nodes that represent links used within the at least one background work to associate the concepts used within the at least one background work to each other;
comparing, by the processor, at least a portion of the target knowledge graph to at least a portion of the background knowledge graph; and
identifying, based on the comparing and by the processor, a potential inconsistency between the at least one background work and the target work.

11. The computer program product of claim 10, wherein the obtaining the target knowledge graph comprises:
receiving the target work by an input device coupled to a computer system, the computer system having the processor and a memory storing one or more natural language processing modules executable by the processor to ingest the content of the target work;
ingesting the content of the target work using the natural language processing modules; and
generating the target knowledge graph using the ingested content of the target work.

12. The computer program product of claim 10, wherein the method further comprises:
notifying, via an output device coupled to a computer system incorporating the processor, a user of the potential inconsistency, wherein a relevant portion of the target work is then rewritten to avoid the potential inconsistency.

13. The computer program product of claim 10, wherein the method further comprises:
matching a pair of target nodes with a corresponding pair of background nodes;
matching, based on the matching the pair of target nodes with the corresponding pair of background nodes, a target edge between the pair of target nodes with a corresponding background edge between the corresponding pair of background nodes;
identifying a first value of the target edge and a second value of the background edge;
comparing, in response to the matching the target edge with the background edge, the first value and the second value; and
determining, based on the comparing the first value and the second value, that the first value and the second value are different, wherein the potential inconsistency is identified based on the first value and the second value being different.

14. The computer program product of claim 10, wherein the method further comprises:
identifying a target edge between a pair of target nodes;
determining that the target edge indicates a relationship between a pair of concepts represented by the pair of target nodes;
determining that existence of the relationship requires that the pair of concepts both exist for at least one time frame in common;
identifying the pair of concepts in the background knowledge graph;
identifying, based on the background knowledge graph, a period of existence for each concept of the pair of concepts;
comparing the periods of existence to each other; and
determining, based on the comparing the periods of existence, that the pair of concepts do not both exist for at least one time frame in common,
wherein the potential inconsistency is identified based on an inconsistency between the determination that the existence of the relationship requires that the pair of concepts both exist for at least one time frame in common and the determination that the pair of concepts do not both exist for at least one time frame in common.

15. The computer program product of claim 10, wherein the identifying the potential inconsistency comprises:
generating a significance score for a first concept represented by a first background node;
determining that the significance score exceeds a significance threshold; and
determining, based on the comparing, that the first concept is not represented within the target knowledge graph.

16. A system comprising:
a memory;
a processor in communication with the memory, the processor configured to perform a method comprising:
obtaining, by the processor, a target knowledge graph generated based on content of a target work, the target knowledge graph including target nodes that represent concepts used within the target work and target edges between target nodes that represent links used within the target work to associate the concepts used within the target work to each other;
obtaining, by the processor, a background knowledge graph generated based on content of at least one background work associated with the content of the target work, the background knowledge graph including background nodes that represent concepts used within the at least one background work and background edges between background nodes that represent links used within the at least one background work to associate the concepts used within the at least one background work to each other;
comparing, by the processor, at least a portion of the target knowledge graph to at least a portion of the background knowledge graph; and
identifying, based on the comparing and by the processor, a potential inconsistency between the at least one background work and the target work.

17. The system of claim 16, wherein the method further comprises:
notifying, via an output device coupled to a computer system incorporating the processor, a user of the potential inconsistency, wherein a relevant portion of the target work is then rewritten to avoid the potential inconsistency.

18. The system of claim 16, wherein the method further comprises:
matching a pair of target nodes with a corresponding pair of background nodes;
matching, based on the matching the pair of target nodes with the corresponding pair of background nodes, a target edge between the pair of target nodes with a corresponding background edge between the corresponding pair of background nodes;
identifying a first value of the target edge and a second value of the background edge;
comparing, in response to the matching the target edge with the background edge, the first value and the second value; and
determining, based on the comparing the first value and the second value, that the first value and the second value are different,
wherein the potential inconsistency is identified based on the first value and the second value being different.

19. The system of claim 16, wherein the method further comprises:
identifying a target edge between a pair of target nodes;
determining that the target edge indicates a relationship between a pair of concepts represented by the pair of target nodes;
determining that existence of the relationship requires that the pair of concepts both exist for at least one time frame in common;
identifying the pair of concepts in the background knowledge graph;
identifying, based on the background knowledge graph, a period of existence for each concept of the pair of concepts;
comparing the periods of existence to each other; and
determining, based on the comparing the periods of existence, that the pair of concepts do not both exist for at least one time frame in common,
wherein the potential inconsistency is identified based on an inconsistency between the determination that the existence of the relationship requires that the pair of concepts both exist for at least one time frame in common and the determination that the pair of concepts do not both exist for at least one time frame in common.

20. The system of claim 16, wherein the identifying the potential inconsistency comprises:
generating a significance score for a first concept represented by a first background node;
determining that the significance score exceeds a significance threshold; and
determining, based on the comparing, that the first concept is not represented within the target knowledge graph.

* * * * *